United States Patent [19]
Hilgeman et al.

[11] 3,862,446
[45] Jan. 21, 1975

[54] TWO POLE SYNCHRONOUS RELUCTANCE MOTOR

[75] Inventors: Clarence B. Hilgeman; E. Roe Poellot, Jr., both of Cincinnati, Ohio

[73] Assignee: Allis-Chalmers Corporation, Milwaukee, Wis.

[22] Filed: Dec. 28, 1973

[21] Appl. No.: 429,218

[52] U.S. Cl. .................................. 310/163, 310/261
[51] Int. Cl. ............................................ H02k 19/06
[58] Field of Search .......................... 310/162–164, 310/211, 261, 168, 166, 269

[56] References Cited
UNITED STATES PATENTS

| | | |
|---|---|---|
| 2,483,848 | 10/1949 | Saretsky............................. 310/162 |
| 3,047,755 | 7/1962 | Angst et al.......................... 310/162 |
| 3,652,885 | 3/1972 | Honsinger........................... 310/163 |
| 3,775,626 | 11/1973 | Borgbacher..................... 310/162 X |

*Primary Examiner*—Donovan F. Duggan
*Attorney, Agent, or Firm*—John P. Hines

[57] ABSTRACT

A two pole synchronous reluctance motor whose rotor has the main conductor winding of each pole encompassing substantially 90 mechanical degrees of the rotor core. A flux barrier extends across the rotor core between the conductors. At least one additional secondary conductor bar is provided between each circumferential end of each pole winding and the flux barrier.

3 Claims, 1 Drawing Figure

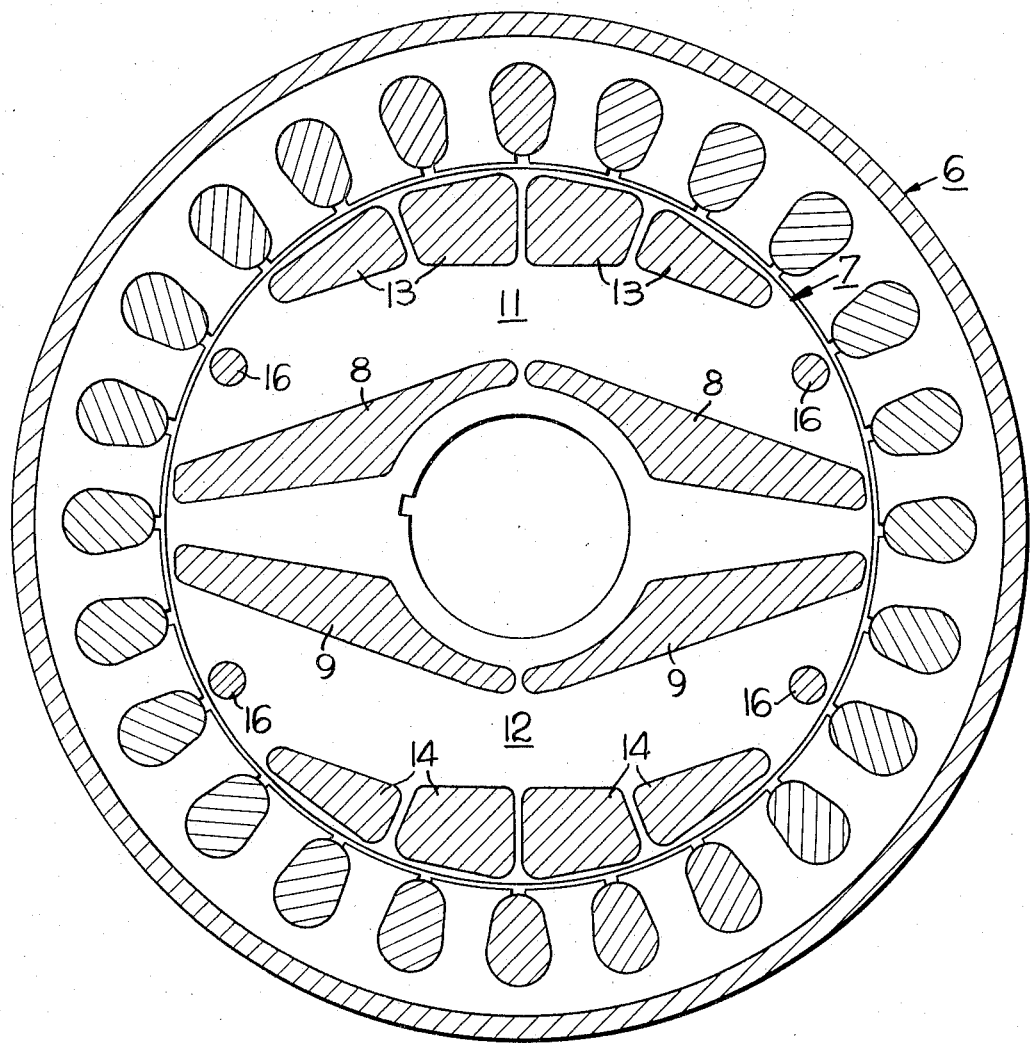

TWO POLE SYNCHRONOUS RELUCTANCE MOTOR

This invention pertains in general to two pole motors and more particularly to two pole synchronous reluctance motors.

For efficient operation the conductor windings of a rotor for a two pole synchronous motor usually encompass approximately 50 percent of each pole. These conductor windings are usually positioned 180° apart about the periphery of the rotor core and encompass substantially 90 mechanical degrees of each pole. It has been found that in certain instances two pole synchronous reluctance motors of this conventional type exhibit undesirable starting characteristics. In certain instances it is impossible to start these two pole machines without some external force being utilized to initiate rotation of the rotor.

Applicants have determined that by providing an additional secondary conductor bar on each side of the main conductor windings in each pole that this undesirable starting characteristic is overcome. It is therefore the intention and general object of this invention to provide a two pole synchronous reluctance motor rotor with additional secondary conductor bars to improve the starting characteristics of the machine over prior art motors of similar design.

An additional object of the subject invention is to provide a two pole synchronous reluctance motor rotor wherein the main conductor windings encompass substantially 90 mechanical degrees of each pole with additional secondary conductor bars positioned adjacent the periphery of each pole and circumferentially spaced from the main conductor windings.

A further object of the subject invention is to provide a synchronous reluctance motor rotor of the hereinbefore described type with flux barriers across the rotor core between the pole windings and wherein the secondary conductor bars are located between the circumferential ends of each main winding and the flux barrier.

A more specific object of the subject invention is to provide a synchronous reluctance motor rotor of the hereinbefore described type wherein the current carrying capacity of each secondary conductor bar is substantially less than the current carrying capacity of the main conductor windings.

These and other objects of the subject invention will become more fully apparent as the following description is read in light of the attached drawing which shows a cross section of a synchronous reluctance motor constructed in accordance with this invention.

Referring to the drawing, the stator 6 is of the conventional induction motor type well known to those skilled in the art. The rotor generally designated 7 is constructed of a plurality of stacked laminations in the manner well known in the prior art. Each lamination is provided with two pairs of cutouts 8 and 9 which are filled with a nonmagnetic material to provide an effective flux barrier. These flux barriers 8 and 9 divide the rotor laminations into two substantially magnetically separated poles 11 and 12.

Each pole is provided with a plurality of cutouts 13 and 14 respectively circumferentially spaced about the periphery of the lamination. These cutouts are filled with a nonmagnetic electrically conductive material and form the conductor windings of each pole. In the normal case each pole winding is connected together at opposite ends by an end ring to form a conventional squirrel cage winding.

The motor so far described is a conventional two pole synchronous reluctance motor. The particular configuration of the main conductor windings disclosed herein is unique and is similar to that disclosed in U.S. Pat. No. 3,652,885. The unique character of the specific configuration of the conductor windings is not a part of this invention and if a further explanation is desired reference to the previously identified patent should be made.

Applicants have determined that under certain conditions a motor constructed in accordance with the description so far disclosed herein exhibits undesirable starting characteristics. It has been found that such a motor cannot be electrically started from standstill if the rotor comes to rest at certain points of rotation. In some applications because of the particular load drive by the motor the rotor had a tendency to stop at the point from which it cannot be electrically started. This requires additional outside mechanical force to initiate rotation of the rotor.

Applicants found that by providing an additional secondary conductor bar 16 between the circumferential ends of each pole winding 13 and 14 and the flux barriers 8 and 9, this undesirable starting characteristic was overcome. After extensive testing it was found that two pole synchronous reluctance motors constructed with the additional secondary conductors could be electrically started in any position that the rotor stopped. With this seemingly simple modification to a well known rotor design an undesirable starting characteristic has been overcome.

The embodiments of the invention in which an exclusive property or privilege is claimed are defined as follows:

1. A rotor for a two pole synchronous reluctance motor comprising:
    a stack of magnetic laminations forming a core having a pair of effective oppositely disposed salient poles, a plurality of circumferentially spaced interconnected conductors in each salient pole portion adjacent the periphery thereof forming main pole windings, the main conductors of each pole encompassing 90 mechanical degrees of said rotor core, flux barriers formed in and extending across said core between said main pole windings with the ends thereof circumferentially spaced from said main pole winding, and at least one additional secondary conductor located in the space between the ends of each main pole winding and each end of said flux barrier adjacent the periphery of said core, the space between the ends of said main pole windings and the circumferentially nearest secondary conductor being greater than the space between any two adjacent main conductors, said conductors being connected together to form a squirrel cage winding.

2. The rotor set forth in claim 1 wherein the secondary conductor is a single conductor equally spaced from the circumferential ends of each main pole winding and the adjacent flux barrier.

3. The rotor set forth in claim 1 wherein the current carrying capacity of the main conductor windings is substantially greater than the current carrying capacity of the secondary conductor bars.

* * * * *